United States Patent
Kreutzer et al.

(10) Patent No.: US 12,050,601 B2
(45) Date of Patent: Jul. 30, 2024

(54) ONTOLOGY-BASED GRAPH QUERY OPTIMIZATION

(71) Applicant: Microsoft Technology Licensing, LLC, Redmond, WA (US)

(72) Inventors: Tor Kreutzer, Tromsø (NO); Amund Kronen Johansen, Tromsø (NO); Steffen Viken Valvåg, Tromsø (NO); Åge Kvalnes, Tromsø (NO); Dag Eidesen, Tromsø (NO); Peter Dahle Heen, Tromsø (NO); Jan-Ove Karlberg, Tromsø (NO); Daniele Vettorel, Cordignano (IT)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/930,848

(22) Filed: Sep. 9, 2022

(65) Prior Publication Data

US 2023/0004559 A1    Jan. 5, 2023

Related U.S. Application Data

(62) Division of application No. 15/445,228, filed on Feb. 28, 2017, now Pat. No. 11,461,318.

(51) Int. Cl.
*G06F 16/2453* (2019.01)
*G06F 16/22* (2019.01)
(Continued)

(52) U.S. Cl.
CPC ...... *G06F 16/2453* (2019.01); *G06F 16/2246* (2019.01); *G06F 16/24534* (2019.01); *G06F 16/367* (2019.01); *G06F 16/9024* (2019.01)

(58) Field of Classification Search
CPC ............ G06F 16/2453; G06F 16/2246; G06F 16/24534; G06F 16/367; G06F 16/9024
See application file for complete search history.

(56) References Cited

U.S. PATENT DOCUMENTS

| | | | |
|---|---|---|---|
| 5,659,728 A | | 8/1997 | Bhargava et al. |
| 6,047,285 A | * | 4/2000 | Jacobs ................ G06F 16/2246 |
| | | | 702/179 |

(Continued)

FOREIGN PATENT DOCUMENTS

| | | |
|---|---|---|
| CN | 102446093 A | 5/2012 |
| CN | 102486784 A | 6/2012 |

OTHER PUBLICATIONS

Wang et al. "Knowledge Graph Embedding by Translating on Hyperplanes", Microsoft Research (Year: 2014).*

(Continued)

*Primary Examiner* — Yuk Ting Choi

(57) ABSTRACT

Examples of the present disclosure describe systems and methods for ontology-based graph query optimization. In an example, ontology data relating to a graph or isolated collection may be collected. The ontology data may comprise uniqueness and topology information and may be used to reformulate a query in order to yield a query that is more performant than the original query when retrieving target information from a graph. In an example, reformulating a query may comprise reordering one or more parameters of the query relating to resources, relationships, and/or properties based on uniqueness information. In another example, the query may be reformulated by modifying the resource type to which the query is anchored based on the topology information. The reformulated query may then be executed to identify target information in the isolated collection, (Continued)

thereby identifying the same target information as the original query, but in a manner that is more performant.

20 Claims, 14 Drawing Sheets

(51) Int. Cl.
*G06F 16/36* (2019.01)
*G06F 16/901* (2019.01)

(56) References Cited

U.S. PATENT DOCUMENTS

| | | | | |
|---|---|---|---|---|
| 6,857,009 B1* | 2/2005 | Ferreria | ............... | H04L 69/16 |
| | | | | 709/224 |
| 7,233,957 B1* | 6/2007 | Sheehy, Jr. | ............ | H04L 1/0061 |
| | | | | 707/999.102 |
| 2008/0021887 A1* | 1/2008 | Brinson, Jr. | ........ | G06F 16/3334 |
| | | | | 707/999.003 |
| 2008/0126297 A1* | 5/2008 | Rowley | ............. | G06F 16/24547 |
| | | | | 707/695 |
| 2013/0246996 A1* | 9/2013 | Duggal | .................... | G06F 8/35 |
| | | | | 717/104 |
| 2014/0037373 A1* | 2/2014 | Cui | ........................ | F24S 25/30 |
| | | | | 403/379.5 |
| 2015/0379061 A1* | 12/2015 | Paraschivescu | ...... | G06F 16/219 |
| | | | | 707/695 |
| 2017/0097984 A1* | 4/2017 | Haldar | .................. | G06F 16/288 |
| | | | | 707/999.102 |
| 2017/0195993 A1* | 7/2017 | Cole | ....................... | G06Q 20/40 |
| | | | | 707/695 |
| 2018/0011945 A1* | 1/2018 | Vaquero Gonzalez | ...................... | |
| | | | | G06F 16/248 |
| | | | | 707/999.102 |
| 2018/0225314 A1* | 8/2018 | Devarao | ............. | G06F 16/2455 |
| | | | | 707/695 |

OTHER PUBLICATIONS

Cao et al. "GrapRep: Learning Graph Representations with Global Structural information" (Year: 2015).*
"Office Action and Search Report Issued in Chinese Patent Application No. 201880014192.8", Mailed Date: Sep. 8, 2022, 20 Pages.
"Notice of Allowance Issued in Chinese Patent Application No. 201880014192.8", Mailed Date: Apr. 2, 2023, 4 Pages.
Office Action Issued in Indian Patent Application No. 201947034630, mailed Date: Jan. 10, 2022 8 Pages.

* cited by examiner

ONTOLOGY-BASED GRAPH QUERY OPTIMIZATION

CROSS-REFERENCE TO RELATED APPLICATIONS

This application is a divisional of U.S. application Ser. No. 15/445,228 filed Feb. 28, 2017, entitled "Ontology-Based Graph Query Optimization," which is incorporated herein by reference in its entirety.

BACKGROUND

A query may be used to retrieve target information from a database. The query may comprise one or more parameters, which the database may use to identify stored information that matches the parameters. However, not all formulations of the query parameters may yield the same performance characteristics, even though such queries containing a similar set of parameters may ultimately return the same target information from the database.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for ontology-based graph query optimization. In an example, ontology data relating to a graph or isolated collection may be collected (e.g., as the content of the isolated collection is changed, periodically, etc.). The ontology data may comprise information relating to the uniqueness of resources and/or properties within the isolated collection. In another example, the ontology data may comprise topology information relating to the isolated collection, including, but not limited to, the average number of relationships for a given resource type. The ontology data may be stored in a data structure, such that values (e.g., relating to uniqueness and topology) may be keyed to the objects (e.g., resources, relationships, or properties) to which they relate.

The ontology data may be used to reformulate a query in order to yield a query that is more performant than the original query when executed to retrieve target information from an isolated collection. In an example, reformulating a query may comprise reordering one or more parameters of the query relating to resources, relationships, and/or properties based on the uniqueness information from the collected ontology data. In another example, the query may be reformulated by modifying one or more resource types to which the query is anchored, based on the topology information from the collected ontology data. As an example, the query may be reformulated so that it is anchored to a resource type having fewer average relationships that the resource type to which it was previously anchored. The reformulated query may then be executed to identify target information in the isolated collection, thereby identifying the same target information as the original query, but in a manner that is more performant.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
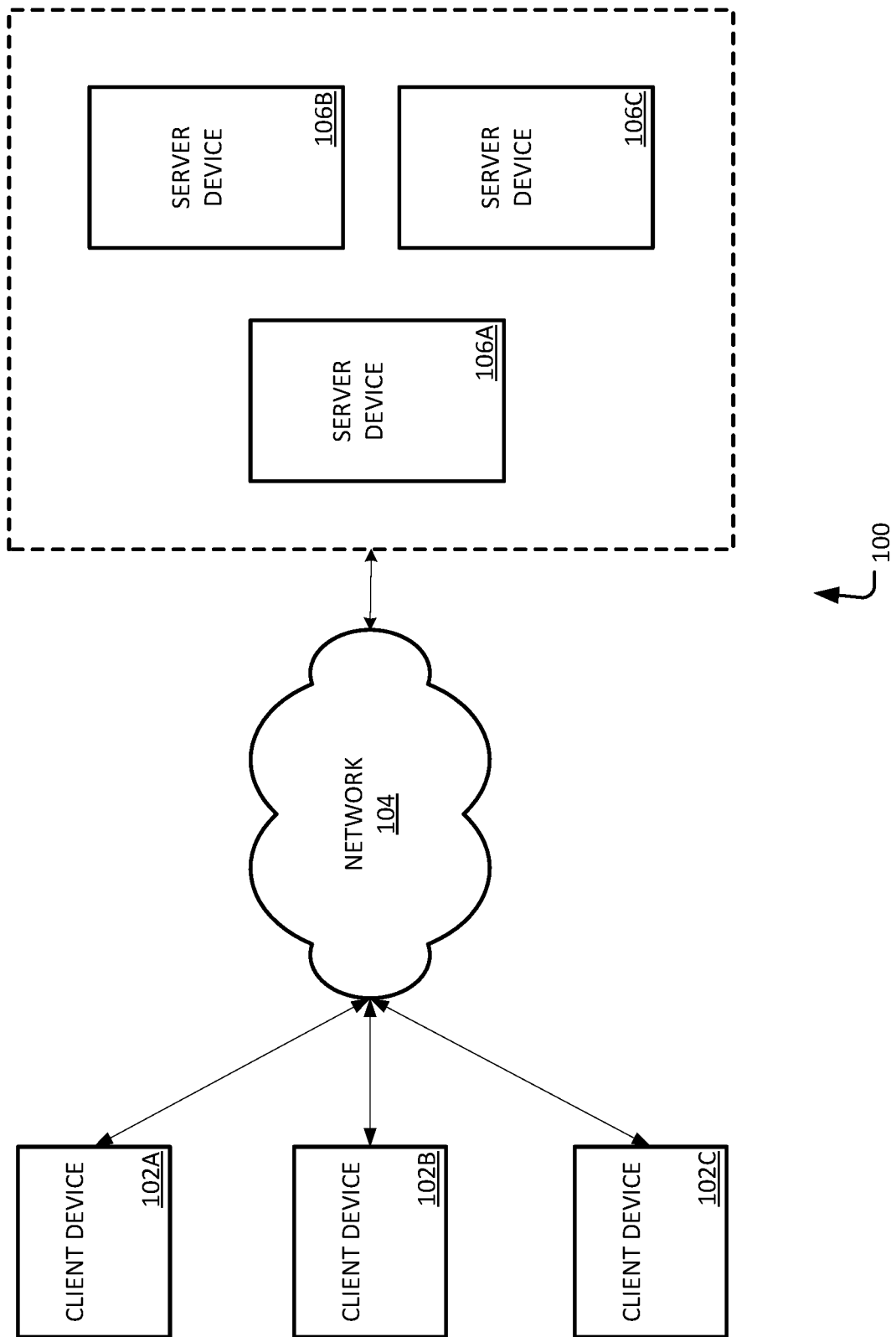
FIG. 1 illustrates an overview of an example system for performing and optimizing queries within an isolated collection.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods for performing ontology-based graph query optimization. In an example, a query for target information within a graph or isolated collection may be reformulated so as to generate a query that identifies the same target information as the original query, but in a way that is more performant. Information may be stored using a graph, wherein the information may be represented using one or more resources and relationships. In order to retrieve information from the graph, a query comprising one or more parameters may be executed to identify target information relating to the one or more parameters within the graph. Unlike relational databases, queries within a graph rely on identifying relationships between resources and examining properties of resources and/or relationships within the graph. As a result, a query within a graph may be executed by traversing the graph using one or more "anchor" resources. However, not all query formulation and/or execution strategies will yield the same performance characteristics despite ultimately identifying the same or similar target information in the graph. As an example, a resource type used to anchor a query or the order in which the query parameters are evaluated may impact query performance. As such, aspects of the present disclosure relate to collecting information relating to the graph and using the collected information to reformulate a query such that the reformulated query may be more performant than the original query.

In some examples, a graph or isolated collection may be comprised of resources and relationships. A resource may be identified by a resource identifier, which may be a durable Uniform Resource Identifier (URI) pointing to the particular resource. The resource identifier may also be a uniform resource locator (URL), uniform resource name (URN), or other suitable identifier or pointers pointing to the resource itself. In one example, the resource may be stored within an isolated collection. In another example, the resource may be stored in a data collection, while an associated resource identifier may be stored in an isolated collection. For example, the resource may reside on a remote server, and the resource identifier may be used to retrieve the resource (e.g., the resource may be stored on a remote web server, where the resource identifier comprises a URL). Identifying the location of a resource may include parsing the resource identifier using, for example, regular expressions, providing one or more portions of the resource identifier to a search utility, executing the resource identifier, etc. Relationships within the isolated collection may identify a correlation between two or more resources in the isolated collection. In some examples, an isolated collection may be a unified dimensional model (UDM), a graph, or other collection of resources and relationships.

A property may be associated with or stored by a resource or relationship of an isolated collection. In an example, the property may be comprised of a name and a value, such that the property may be used to store information relating to a resource or relationship. As an example, an "email" property (e.g., having the name "email") for a "person" resource may store an e-mail address (e.g., as the value for the "email" property) for the person to which the "person" resource relates. In another example, a "relation" resource for a "family member" relationship may indicate that the "family member" relationship specifies a "brother" relationship for the relationship indicated by the "family member" relationship. As will be appreciated, a property may contain information other than a name and/or a value and may be stored as or associated with any type of information within a graph or an isolated collection.

The resources, or resource identifiers, and/or relationships may be provided by a developer or other external source. Such resources, resources identifiers, and relationships are referred to herein as asserted resources, asserted resource identifiers, and asserted relationships. Each isolated collection may also be enriched to create additional relationships and in some examples additional resource identifiers, by executing a ruleset against the data already in the isolated collection. The additional data generated through execution of such a ruleset is referred to herein as inferred data, such as inferred relationships, inferred resources, and inferred resource identifiers. Queries may then be executed against the isolated collection that includes both the asserted data and inferred data to provide richer results than would otherwise be available solely from the asserted data alone. The isolated collection may also be stored as graph database, and results to queries of the isolated collection may be displayed in a graphical format wherein resources are displayed as nodes and the relationships are displayed as edges. As used herein, an isolated collection of resource identifiers and the relationships between those resources or resource identifiers may be referred as a "Set." Further, access to the isolated collection may be controlled through various techniques to provide additional security measures for the content in each isolated collection, and each isolated collection may have different rule sets to generate unique and different inferred data to meet the particular needs of each application.

An isolated collection may be queried to identify or retrieve target information (e.g., properties, resources, and/or relationships) relating to a query. The query may be comprised of one or more parameters or constraints relating to a relationship type, the type or content of a resource, or any other property of a relationship or a resource. In some examples, the parameters may relate to a plurality of resources (e.g., such as a friend-of-a-friend relationship or a resource that is common to a plurality of otherwise unrelated resources, etc.). The parameters of the query may relate to one or more "anchor" resources or resource types, which may be used when executing a query to identify a context or starting resource for query evaluation. As an example, an anchor resource may be a resource type or a plurality of resource types associated with a relationship, such that resources within the isolated collection matching the one or more resource types are identified and further evaluated based on the parameters of the query. Given the wide array of possible resources and relationships that may be stored by or represented within an isolated collection, performing such queries may be resource-intensive. In an example, some queries may be less performant depending on the structure of the query (e.g., the order of the parameters, the direction of the relationships, etc.) or the resource used to anchor the query. As a result, according to aspects disclosed herein, a query may be reformulated to generate a query that is more performant than the original query while still identifying the same target information.

In an example, the performance of a query may be evaluated based on one or more of a variety of factors, including, but not limited to, the amount of read operations that are performed, memory consumption, the number of intermediate results that are returned, or execution time. In some examples, performance metrics may be determined based on actual queries that are executed in the isolated collection. In other examples, performance metrics may be estimated from information relating to the isolated collection, information from previously-executed queries, or other information. As will be appreciated, query performance may be determined based on any factor, such that a query may be deemed "more performant," "more efficient," or "optimal" in relation to another query based on one or more such factors. Further, query performance need not be optimal in actuality, but may instead be optimal in the probabilistic sense, such that it may be expected or estimated that the query would be more performant over other queries. Thus, while a specific query may in fact perform sub-optimally in one instance, it may, on average or as a whole, still be deemed more performant in some or most instances.

In order to generate a more performant query for target information in an isolated collection, a query may be reformulated based on ontology data relating to the isolated collection, including, but not limited to, its topology (e.g., its structure, the number of relationships among resources, the number of resources of a given type, etc.) or the uniqueness or frequency of information within the graph (e.g., the frequency of properties, resources, and/or relationships). In some examples, other information may be evaluated, such as an index of information (e.g., an index relating to the target information, to one or more of the query parameters, or to a specific type of resource, relationship, or property within the isolated collection, etc.), information provided or associated with the query, or data from previous queries (e.g., previously-executed queries and/or related results, performance metrics, etc.). In an example, reformulating a query may comprise altering the query order of parameters, removing or adding a parameter, or modifying the anchor of the query, among other reformulation techniques.

As an example, uniqueness information may comprise a uniqueness index for properties and/or a uniqueness index for resource types within an isolated collection. A uniqueness index may be determined algorithmically (e.g., based on a statistical model, computed in relation to the observed uniqueness of other properties and/or resources, etc.) or may be a frequency measurement relating to a property or resource type in the isolated collection, among other metrics. In some examples, uniqueness indexes for various objects (e.g., resources, properties, etc.) may be relative to one another and may therefore be comparable, such that different objects may be compared based on their respective uniqueness index. In other examples, a uniqueness index may only be comparable among similar objects (e.g., a property uniqueness index may be comparable to other property uniqueness indexes, and a resource type uniqueness index may only be comparable among other resource type uniqueness indexes). As a result, uniqueness indexes may be used to compare one or more parameters of a query to determine a query order with which properties and resource types may be evaluated.

In another example, topology information may comprise frequency information relating the average number of relationships for the resource types to which they relate. As an example, the average number of relationships per resource type may be determined in order to compare resource types and determine which resource type may be a better anchor resource type when executing a query. For example, an isolated collection may contain person resources and project resources, and a relationship may exist between each person resource and each project resource on which a person has worked. If a person, on average, works on ten projects, but each project, on average, has 20 people working on it, the average number of relationships for a person resource type would be ten, while the average number of relationships for a project resource type would be 20. As such, the average number of relationships for a resource may be used to determine which "direction" a query should be performed so as to evaluate resources having a lower number of average relationships. Thus, it may be more performant to anchor a query based on person resources (having an average of ten relationships) rather than project resources (having an average of 20 relationships). As such, a query may be reformulated such that the query direction is from a person resource to a project resource, rather than from a project resource to a person resource.

As will be appreciated, other uniqueness information or topology information may be gathered in order to reformulate a query. In some examples, the type of information may depend on how queries are structured or performed. For example, the average number of relationships for a resource type may be relevant when a query is anchored to a specific resource type. If a query may be constructed using a relationship as an anchor rather than a resource, it may be useful to quantify and evaluate the number of different resource types for which a given relationship type may be used when reformulating a query. Further, while the above example relates to person resources and project resources, it will be appreciated that aspects disclosed herein may relate to any domain, resource type, and relationship type.

At least some of the information used to reformulate a query may be stored or gathered prior to query reformulation. As an example, ontology data (e.g., uniqueness information, topology information, etc.) relating to an isolated collection may be generated and stored in advance. In some examples, the ontology data may be updated when the content of the isolated collection changes (e.g., when a resource, relationship, or property is added, removed, or modified, etc.), updated periodically (e.g., at certain time intervals, in response to the occurrence of an event, etc.), or a combination thereof. As will be appreciated, other information may be gathered relating to the isolated collection (e.g., the number of resources within an isolated collection, interconnectedness metrics, etc.), and ontology data may be updated or generated at other intervals or in response to any event.

In an example, ontology data (or other information, such as index information or previous query data) may be stored in one or more data structures, such as a PATRICIA tree (Practical Algorithm to Retrieve Information Coded in Alphanumeric tree), a hash table, or any other data structure. In some examples, in order to facilitate efficient data storage and retrieval, each value (e.g., a uniqueness index, topology information, etc.) stored in the data structure may be associated with a key (e.g., a hash value relating to the stored information such as a property name, a resource type, or a relationship type, among others) that may be used when creating, updating, and retrieving a value from the data structure. As will be appreciated, ontology data and other information used to reformulate a query may be stored and retrieved in any manner without departing from the spirit of this disclosure.

FIG. 1 illustrates an overview of an example system for performing and optimizing queries within an isolated collection. Example system 100 may be a combination of interdependent components that interact to form an integrated whole for optimizing queries within an isolated collection. In aspects, system 100 may include hardware components (e.g., used to execute/run operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 8-11. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch and text input. The interface component may enable the creation, modification and navigation of various data sets and graphical representations. In examples, the various datasets may comprise (or be otherwise associated with), for example, resource identifiers, resource metadata, relationship information, asserted relationships, graphical mapping information, query data, rule sets, such as, for example, inference rules, authorization information, authentication information, etc., as discussed in further detail below. Generally, the datasets are stored on one or more server devices 106A-C and are accessible by the client devices 102A-C. In some examples, however, the datasets may be at least partially stored on one or more of the client devices 102A-C The underlying resources represented in the various datasets may be stored locally or in a data store, such as a cloud storage application, accessible to client devices 102A-C. In at least one example, the underlying resources represented in the various datasets (or portions thereof) may be distributed across client devices 102A-C. For instance, client device 102A (e.g., a mobile phone) may locally store a first portion of the resources represented in the dataset, client device 102B (e.g., a tablet) may locally store a second portion of the resources, and client device 102C (e.g., a laptop) may locally store the remaining portion of the resources represented in the dataset. In examples, the client devices 102A-C may have access to all of the resources included in the data set, may have access to a subset of the resources included in the dataset, or, alternatively, may not have access to any of the resources included in the dataset.

Client devices 102A-C may be further configured to interrogate data stores comprising the resources corresponding to the resource identifiers in the various data sets. In examples, client devices 102A-C may interrogate content providers, such as server device 102A-C, via distributed network 104. The interrogation may include identifying the remote device on which a resource is located, and/or determining whether the remote device (or a service/separate remote device) has authenticated access to the resource. If access to the resource has been authenticated, client devices 102A-C may retrieve an authentication indication from the remote device. Client devices 102A-C may use the authentication indication to provide access to one or more of the various datasets comprising the corresponding resource identifier.

Server devices 106A-C may be configured to store and/or provide access to one or more resources. For example, server device 102A may be a web server, server device 102B may be a device comprising a collaborative messaging tool and a calendaring application, and server device 102C may be electronic mail server. Each of these devices may comprise a repository of resources that is accessible via one or more authentication mechanisms. In examples, server devices 106A-C may perform or monitor the authentication process when a request for a resource is received. If the authentication is successful, the authenticating device may store or maintain an authentication indication for a specified period of time. When the period of time expires, server devices 106A-C may remove or attempt to renew the authentication indication. In examples, server devices 106A-C may provide the authentication indication to an interrogating client device. In some aspects, server devices 106A-C may further be configured to store at least a portion of the various data sets and graphical representations, as discussed above.

Figure 2:
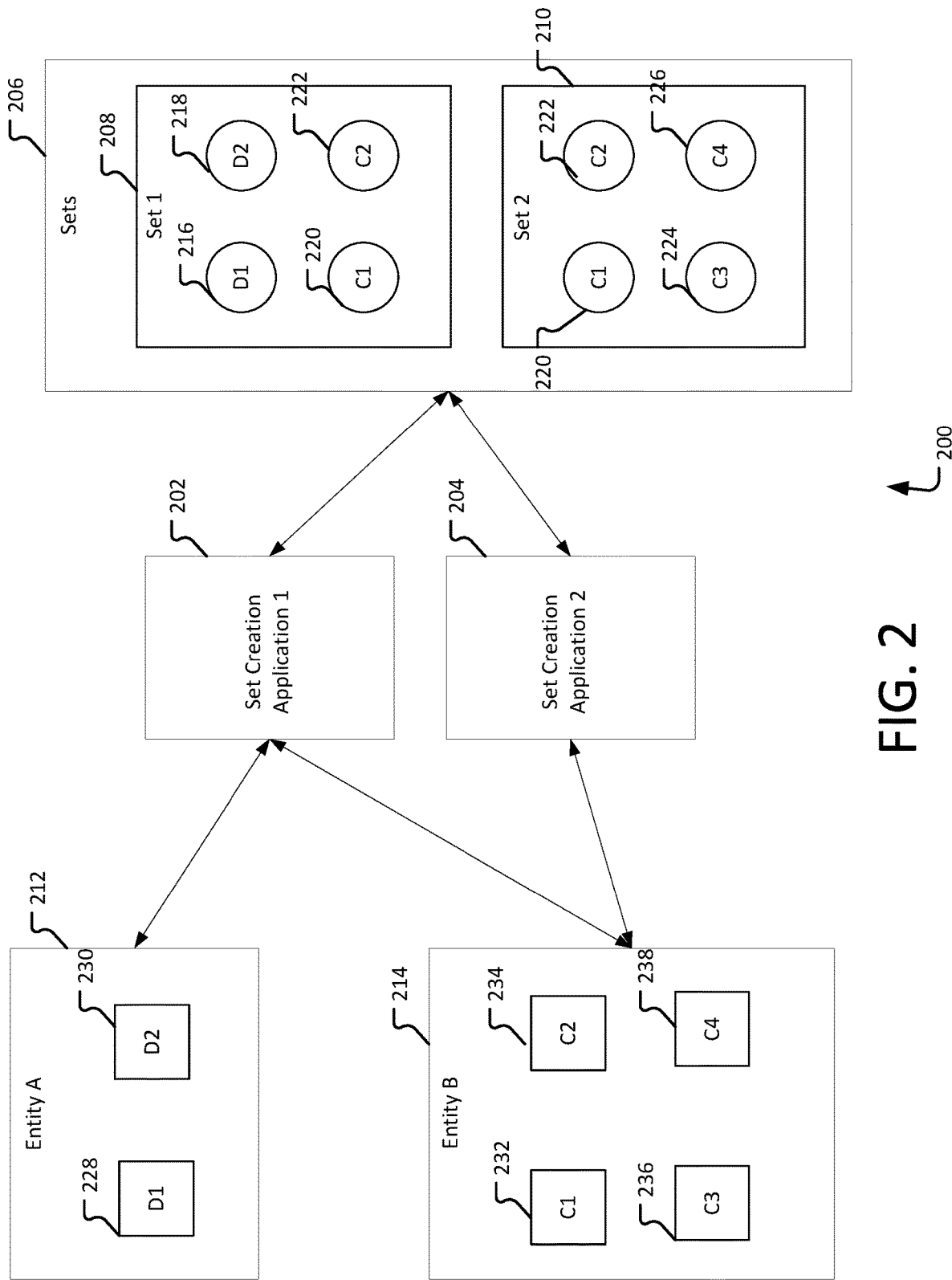
FIG. 2 illustrates an overview of an example system for managing isolated collections of resource identifiers and corresponding relationships.

FIG. 2 illustrates an overview of an example system 200 for managing isolated collections of resource identifiers and corresponding relationships. The isolated collection techniques implemented in system 200 may comprise or be associated with one or more of the delegated authentication techniques described in FIG. 1. In alternative examples, a single device (comprising one or more components such as processor and/or memory) may perform the processing described in systems 100 and 200, respectively.

With respect to FIG. 2, system 200 may comprise Set creation applications 202 and 204, Set environment 206, Sets 208 and 210, entities 212 and 214, resources identifiers 216, 218, 220, 222, 224 and 226, and resources 228, 230, 232, 234, 236 and 238. In aspects, Set creation applications 202 and 204 may be an application or service configured to create, infer, manipulate, navigate and visualize various resources, relationships and graphical representations. Set creation applications 202 and 204 may define collections of relationships between resources (e.g., people, files, tasks, mail, documents, calendar events, etc.) and executing queries on those collections. Set creation applications 202 and 204 may further provide for defining and storing rulesets used to infer one or more relationships in the collections, and displaying graphical representations of the collection data. The defined rulesets may be stored in the Set itself, and in some examples is stored as metadata within the Set. In examples, Set creation applications 202 and 204 may be installed and executed on a client device or on one or more devices in a distributed environment. For instance, Set creation application 202 may be installed on client device 102A, Set creation application 204 may be installed on client device 102B, and a Set creation service associated with server device 106A may be accessible to client device 102C.

In aspects, Set creation applications 202 and 204 may have access to a file directory or an execution environment, such as environment 206. Environment 206 may be collocated with a Set creation application, or environment 206 may be located remotely from the Set creation application. Environment 206 may provide access to one or more data collections, such as Sets 208 and 210. In examples, access to the data collections may be determined using one or more sets of permissions generated and/or maintained by Set creation applications 202 and 204. The sets of permissions may be different across one or more of the data collections. As a result, one or more of the data collections (or functionality associated therewith) may not be accessible from one or more of Set creation applications 202 and 204.

Sets 208 and 210 may respectively comprise isolated collections of asserted resource identifiers and corresponding relationships. The relationships in the isolated collections may be defined manually or may be automatically derived using one or more rulesets. The isolated collections may be represented using graphical structures that directly relate resources in the data collection and provide for retrieving relationship data with a single operation. Each isolated collection may comprise resource identifiers that are unique to that isolated collection. Alternately, the isolated collections may comprise resource identifiers included in one or more alternate isolated collections. For example, as depicted in FIG. 2, Set 208 may comprise resource identifiers 216, 218, 220 and 222, and Set 210 may comprise resource identifiers 220, 222, 224 and 226. Resource identifiers 216, 218, 220, 222, 224 and 226 may correspond to, and/or identify the location of, one or more resources. As used herein, a resource identifier references an existing resource, but is not itself a resource. Exemplary types of resource identifiers include, but are not limited to, a Uniform Resource Identifier (e.g., a Uniform Resource Locator (URL), a Uniform Resource Name (URN) etc.), an IP address, a memory or storage address, and the like. One of skill in the art will appreciate that any type of identifier may be employed by the various aspects disclosed herein without departing from the scope of this disclosure. Identifying the location of a resource may include parsing the resource identifier using, for example, regular expressions, providing one or more portions of the resource identifier to a search utility, executing the resource identifier, etc. In aspects, having access to the data collections does not guarantee access to the resources identified by the resource identifiers included in each data collection. For example, although a user may be able to access and manipulate Set 208, the user may not be authorized to access one or more of the underlying resources corresponding to the resource identifier in Set 208.

Resource providers 212 and 214 may be configured to store and/or provide access to one or more resources. As such, a resource provider as used herein may be a data store, a cloud service provider, a client computing device, a server computing device, a distributed system of devices, such as, for example, an enterprise network, an application, a software platform (e.g., an operating system, a database, etc.), and the like. In aspects, resource providers 212 and 214 may be (or have access to) various different data sources, such as content providers, data stores, various sets of application data, and the like. The data stores may comprise one or more resources corresponding to one or more resource identifiers. For example, as depicted in FIG. 2, resource provider 212 may be a data store comprising various different types of resources such as resource 228 (e.g., document 1 (D1)) and resource 230 (e.g., presentation 2 (P1)) and resource provider 214 may be a contact management application comprising contact resources 232 (e.g., contact 1 (C1)), 234 (e.g., contact 2 (C2)), 236 (e.g., contact 3 (C3)) and 238 (e.g., contact 4 (C4)). In this example, resource identifier 216 may correspond to resource 228; resource identifier 218 may correspond to resource 230; resource identifier 220 may correspond to resource 232; resource identifier 222 may correspond to resource 234; resource identifier 224 may correspond to resource 236; and resource identifier 226 may correspond to resource 238. In some aspects, resource providers 212 and 214 may be accessible by Set creation applications 202 and 204. Set creation applications 202 and 204 may access resource providers 212 and 214 to determine the existence of resources and/or retrieve information associated with the resources (e.g., resource metadata, resource location, resource identifiers, permission sets, authentication data, etc.). The information retrieved from resource providers 212 and 214 may be used to determine a set of resource identifiers corresponding to one or more of the available resources. The set of resource identifiers may be used to create one or more isolated collections of asserted resource identifiers and corresponding relationships. As noted above, the resource identifiers may be, or include, a durable URI for its corresponding resource. For instance, the resource identifier 216 may include the URI for the actual document (D1) 228. Accordingly, in such an example, a user is able to determine the location of the document (D1) 228 from the Set, and, depending on authentication and access restrictions, retrieve the document (D1) 228. As another example, as depicted in FIG. 2, resource provider 212 may be accessed by Set creation application 202. Set creation application 202 may determine that resource provider 212 comprises at least resources 228 and 230, and may determine resource identification information for each of the resources. Based on the determined resource identification information, resource identifiers 216 and 218 may be respectively applied/correlated to resources 228 and 230, and provided to environment 206. Environment 206 may then make resource identifiers 216 and 218 eligible for an inclusion analysis into one or more isolated collections.

Figure 3A:
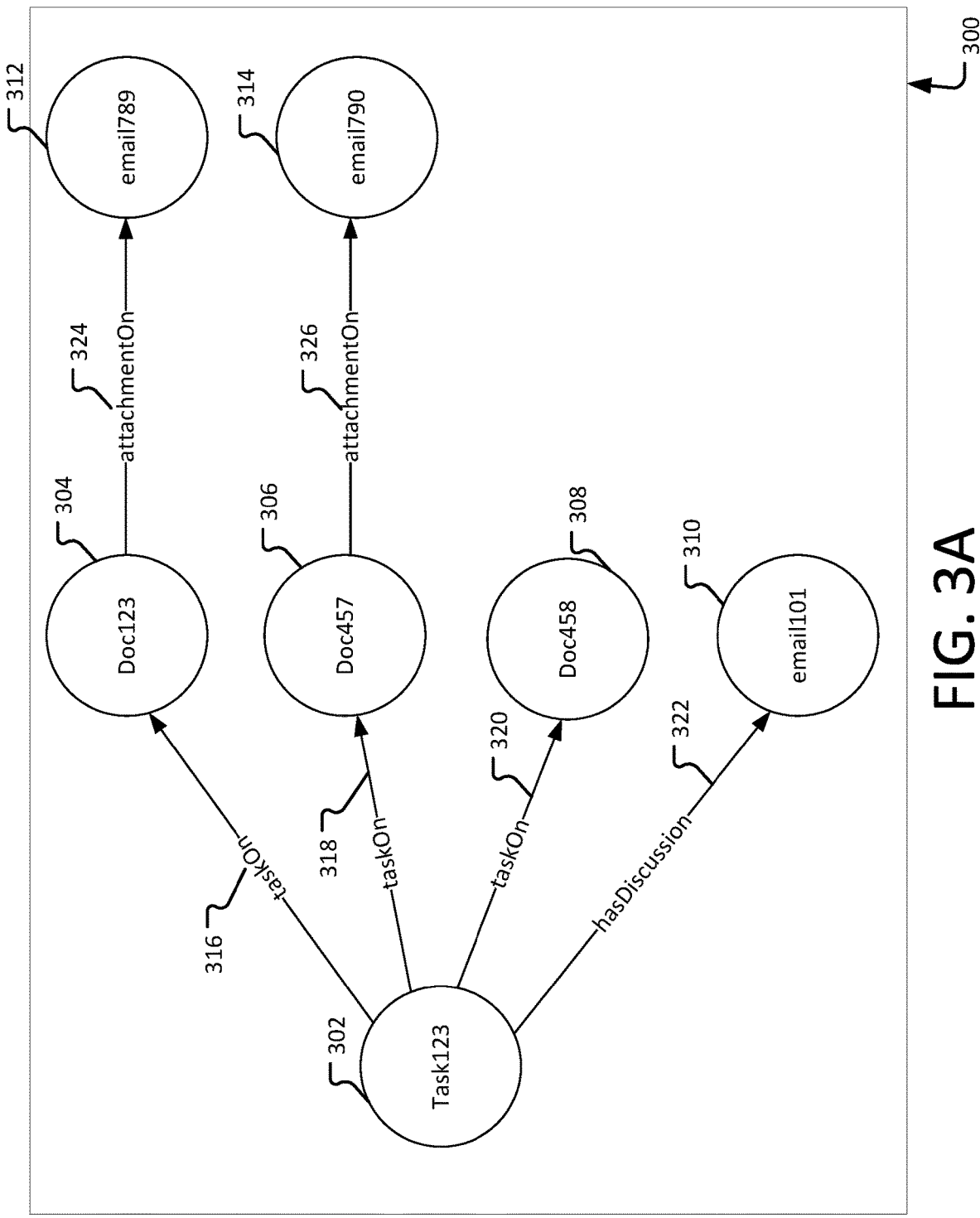
FIG. 3A illustrates an overview of an example isolated collection.

FIG. 3A illustrates an example isolated collection 300 of asserted resource identifiers and corresponding relationships. Example isolated collection 300 comprises resource identifiers 302, 304, 306, 308, 310, 312 and 314, and relationships 316, 318, 320, 322, 324 and 326. In aspects, isolated collection 300 may be generated and/or manipulated using a collection creation utility that may be included as part of a Set creation application as discussed above. When presented in graph form as depicted in the FIG. 3A, each resource identifier may be referred to as a "node" and each relationship may be referred to as an "edge." The collection creation utility may also identify resources and/or determine resource types for collections using one or more rulesets that may include rules defined in accordance with semantic web technologies, such as resource description framework (RDF), RDF schema (RDFS), SPARQL Protocol and RDF Query Language (SPARQL), Web Ontology Language (OWL), etc. For example, collection 300 includes a resource identifier 312 that represents an underlying resource, "email789" in the depicted example. Similarly, resource identifier 304 represents a resource document, "Doc123," and resource identifier 302 represents a resource task, "Task123." Each of the resources and relationships included in the isolated collection 300 may have been asserted by a developer through a Sets creation application. For instance, a developer may manually add each of the resource identifiers and the relationships between the resource identifiers. As an example, the developer may manually indicate that the "task123" is a task on "Doc123," as represented in the collection 300 by the "taskOn" relationship 316. The resource identifiers and relationships may also be asserted by an external bot or application created by a developer. For instance, an add-in may be programmed to monitor activity in a browser or other application to track usage of the application. Based on the usage of the application, the add-in sends additional resources and relationships to be included in the collection 300.

In contrast to the asserted resource identifiers and relationships, a collection creation utility may execute a ruleset to determine additional relationships and resource types, referred to herein as "inferred relationships" and "inferred resource identifiers" or "inferred resource types." For example, upon execution of a ruleset, the collection creation utility may determine that resource identifier 312 represents an email message, and resource identifier 304 represents a document. Generation of inferred relationships and resources is discussed in further detail below.

Isolated collection 300 further depicts that resource identifier 302 is associated with resource identifiers 304, 306 and 308 and resource identifier 310. The collection creation utility may determine that the resource identifier 302 represents a task to be performed on identifiers 304, 306, and 308. Based on this determination, the collection creation utility may assign relationships 316, 318 and 320 (e.g., "taskOn") to define the association between resource identifier 302 and resource identifier 304, 306 and 308. In other examples, the relationships 316, 318, and 320 may be asserted, as discussed above. Additional relationships, such as the "hasDiscussion" relationship 322 may have been asserted manually by a developer or asserted from an add-in of an e-mail application that analyzed the content of e-mail 101. While specific types of resources and relationships are described in FIG. 3A, one of skill in the art will appreciate that other types of resources and/or relationships may be included in an isolated collection without departing from the spirit of this disclosure.

Figure 3C:
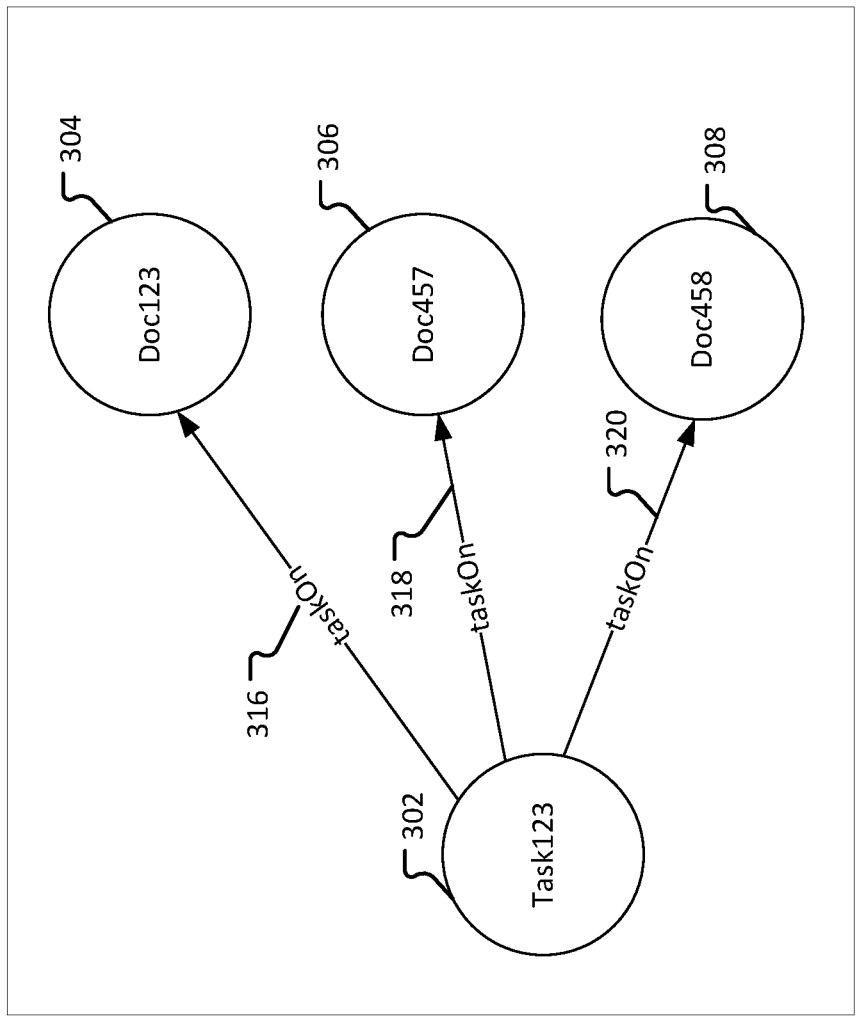
FIGS. 3B-3E illustrate an example query model that may be used to traverse an isolated collection.
Figure 3B:
Figure 3D:
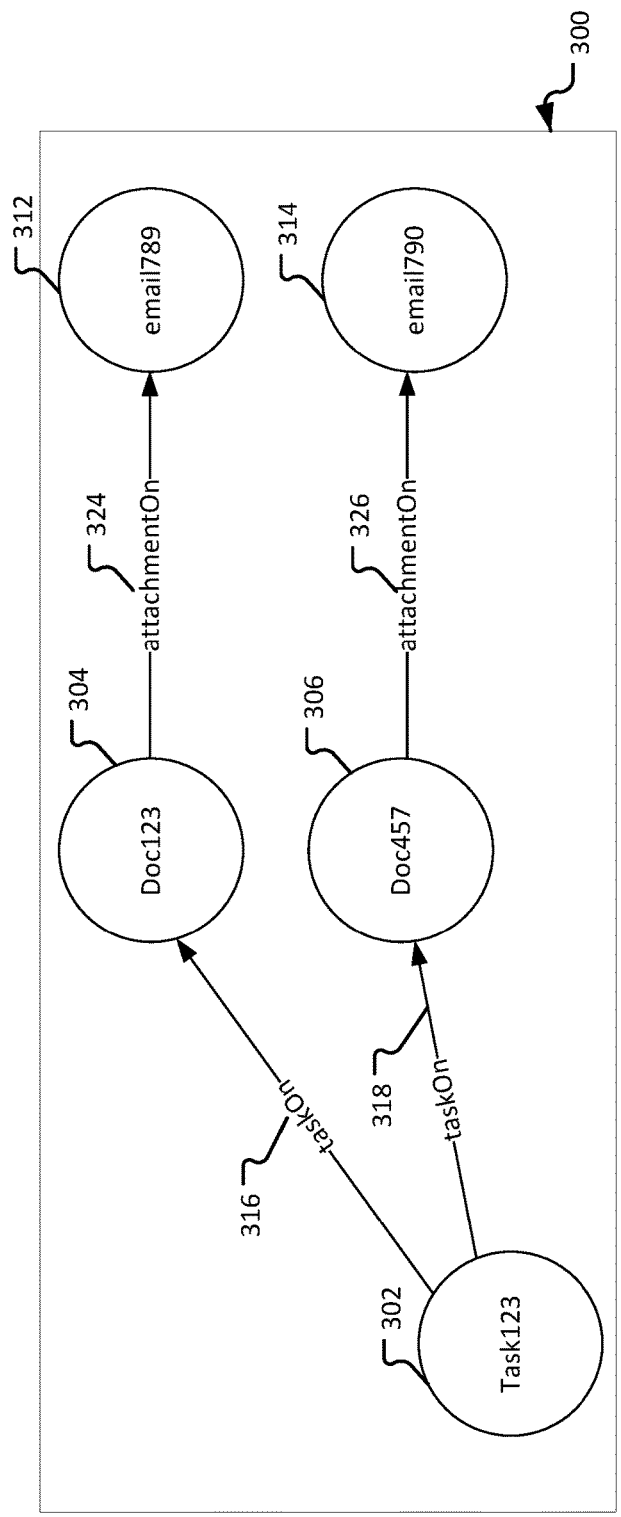
Figure 3E:
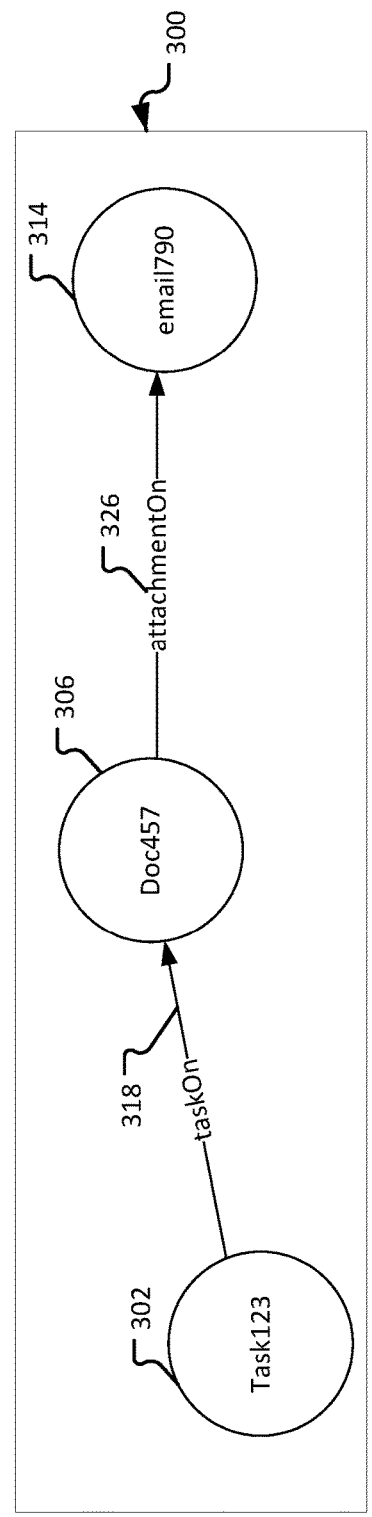

FIGS. 3B-3E illustrate an example query model that may be used to traverse collection 300. In aspects, queries may be executed via an interface provided by the collection creation utility. A query may be executed against one or more files and/or directories comprising information, such as resource identifiers, resource type, resource metadata, permission data, etc. The query results may be visualized in a graph form as one or more collections, such as collection 300. For example, the entire collection 300 dataset may comprise only those elements illustrated in collection 300 (e.g., resource identifiers 302, 304, 306, 308, 310, 312 and 314 and relationships 316, 318, 320, 322, 324 and 326). In this particular example, resource identifier 312 may represent an e-mail comprising the subject "API Design" and resource identifier 314 may represent an e-mail comprising the subject "Sets." The query 'http:// . . . /collection300/task123' may be executed against collection 300. The query results may comprise resource identifier 302 and be visualized as illustrated in FIG. 3B. In FIG. 3C, the query has been amended to 'http:// . . . /collection300/task123?$expand=taskOn' and executed against collection 300. The query results may comprise resource identifiers 302, 304, 306 and 308 and relationships 316, 318 and 320, and be visualized as illustrated in FIG. 3C. In FIG. 3D, the query has been amended to 'http:// . . . /collection300/task123?$expand=taskOn($expand=attachmentOn)' and executed against collection 300. The query results may comprise resource identifiers 302, 304, 306, 308, 312 and 314 and relationships 316, 318, 320, 324 and 326, and be visualized as illustrated in FIG. 3D. In FIG. 3E, the query has been amended to 'http:// . . . /collection300/task123?($expand=taskOn($expand=attachmentOn)($filter=Subject eq 'Sets'))' and executed against collection 300. As only resource identifier comprises 314 the subject "Sets", the query results may comprise resource identifiers 302, 306 and 314 and relationships 318 and 326, and be visualized as illustrated in FIG. 3E.

Figure 4:
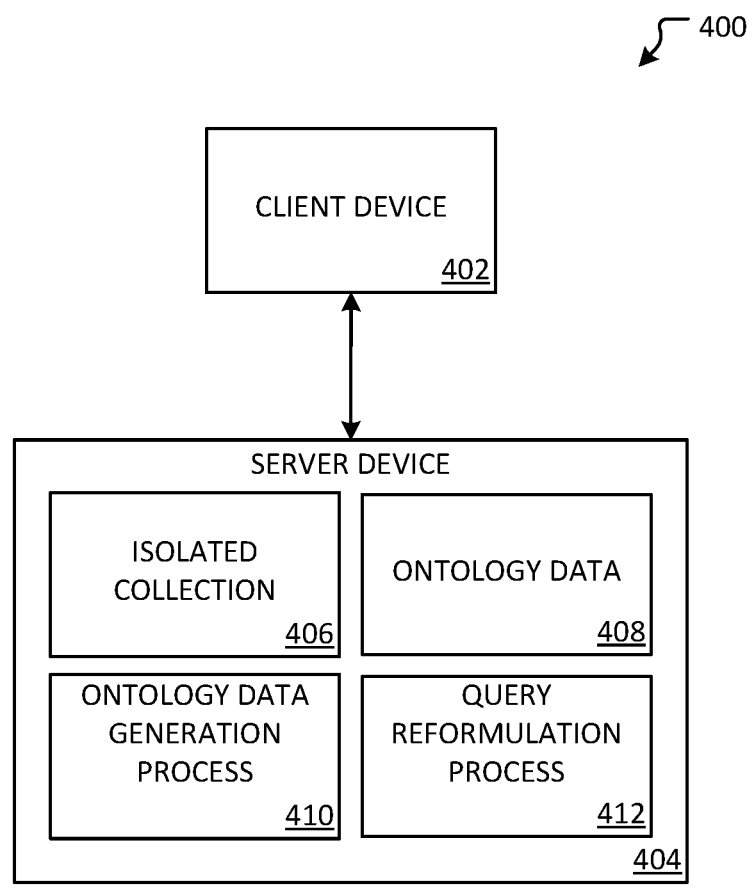
FIG. 4 illustrates an overview of an example system for performing ontology-based query optimization.

FIG. 4 illustrates an overview of an example system for performing ontology-based query optimization. Figure 400 may be comprised of client device 402 and server device 404. In some examples, client device 402 may be one of client devices 102A-C and server device 404 may be one of server device 106A-C in FIG. 1. While only one client device and one server device are shown in FIG. 4, it will be appreciated that multiple client devices, multiple server devices, or any combination thereof may be used to practice aspects of the present disclosure.

Server device 404 may be comprised of isolated collection 406, ontology data 408, ontology data generation process 410, and query reformulation process 412. Isolated collection 406 may store one or more resources and relationships according to aspects disclosed herein. Client device 402 may access information stored by server device 404. In some examples, client device 402 may provide a query formulated using a query language (e.g., Cypher Query Language, SPARQL, etc.) to server device 404 to access information stored by isolated collection 406. As will be appreciated, while components 406-412 are pictured as part of server device 404, components 406-412 may be distributed among multiple computing devices, may be part of client device 402, or may be combined such that the functionality described herein relating to a plurality of components 406-412 may be performed by a single component.

Figure 5:
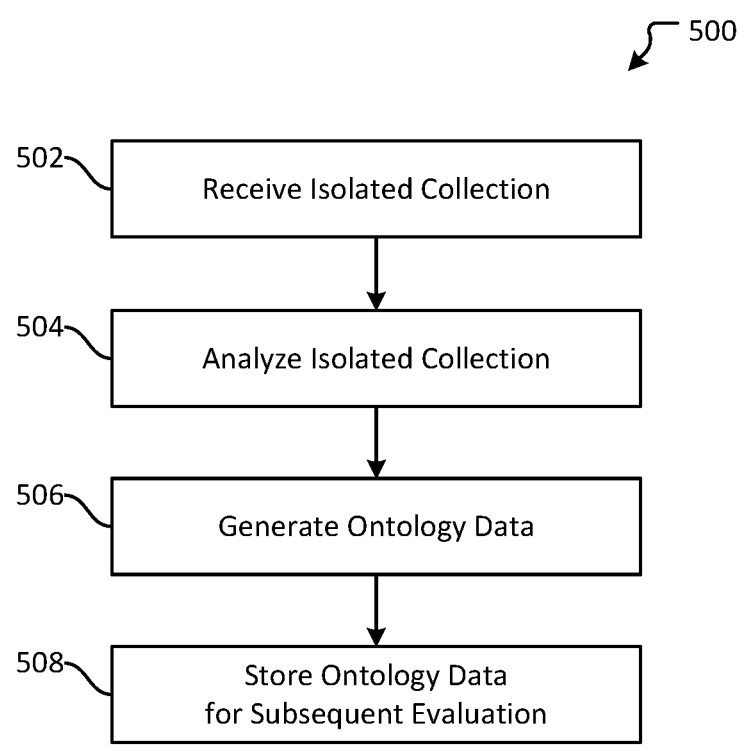
FIG. 5 illustrates an overview of an example method for generating ontology data for an isolated collection.
Figure 6:
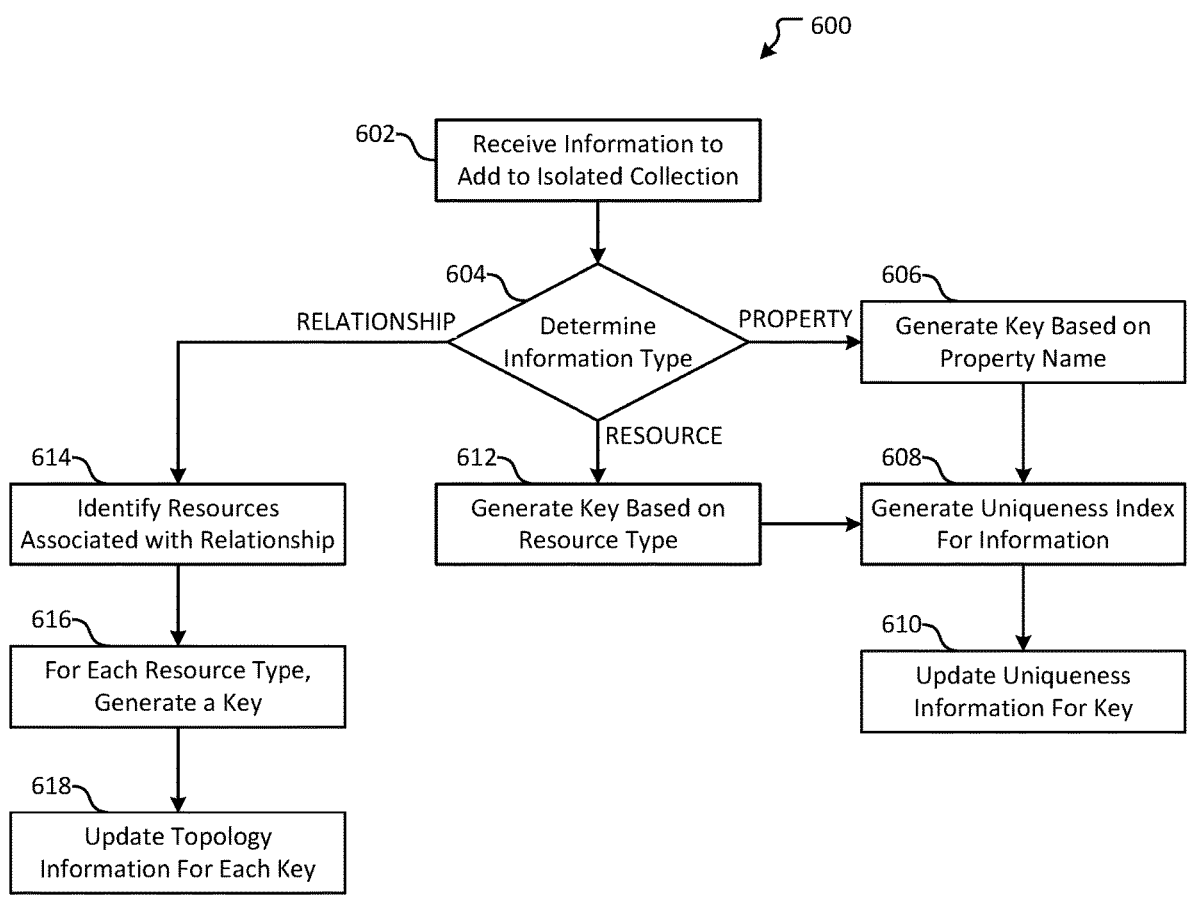
FIG. 6 illustrates an overview of an example method for generating ontology data for an isolated collection.

In an example, ontology data 408 may store data relating to isolated collection 406, including, but not limited to, uniqueness information or topology information. Ontology data 408 may be comprised of one or more data structures. Ontology data 408 may be generated and maintained by ontology data generation process 410. In an example, ontology data generation process 410 may generate and store information in ontology data 408 by performing one or more of the operations discussed below with respect to method 500 and method 600 as illustrated in FIG. 5 and FIG. 6, respectively. As described above, ontology data generation process 410 may update ontology data 408 when the content of isolated collection 406 changes (e.g., by adding, removing, or updating a resource, relationship, or property), after a certain amount of time has elapsed, or in response to the occurrence of an event (e.g., adding a user to the isolated collection, importing data from another isolated collection, determining that isolated collection 406 may be queried for information, etc.), among other events.

Figure 7:
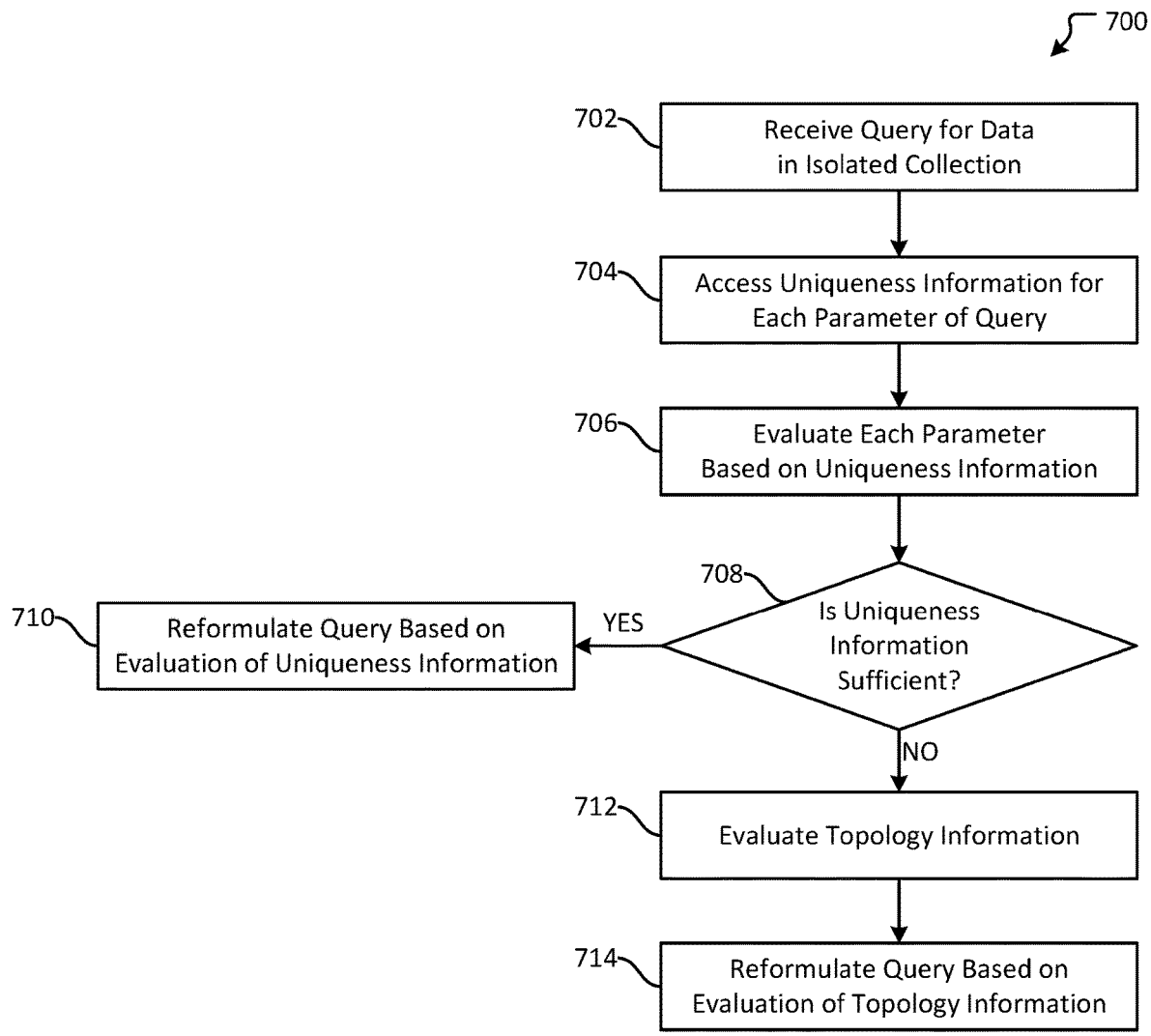
FIG. 7 illustrates an overview of an example method for reformulating a query using ontology data.

Query reformulation process 412 may receive a query for data stored by isolated collection 406. In an example, query reformulation process 412 may perform one or more of the operations discussed below with respect to method 700 as illustrated in FIG. 7. According to aspects disclosed herein, query reformulation process 412 may reformulate the received query in order to generate a query that is more performant than the original query when executed to identify target data in isolated collection 406. In an example, query reformulation process 412 may access ontology data 408 and use information from ontology data 408 when reformulating a query. In some examples, query reformulation process 412 may access other data in addition to or as an alternative to ontology data 408. As an example, query reformulation process may access data stored by or associated with isolated collection 406. Query reformulation process 412 may evaluate the parameters of a query in relation to the accessed data in order to generate an optimal query.

In an example, query reformulation process 412 may evaluate uniqueness information (e.g., as may be stored in ontology data 408) for each property and resource type of the query. Query reformulation process 412 may compare the uniqueness information for each property and/or resource type to determine whether there may be a more performant order in which the parameters of the query should be executed when searching within isolated collection 406 (e.g., by performing one or more of operations 704-710 of method 700 in FIG. 7). In some examples, uniqueness information for a property may be compared to uniqueness information for other properties and uniqueness information for a resource type may be compared to uniqueness information for other resource types. In other examples, uniqueness information for a property or resource type may be compared to uniqueness information for other properties or resource types. As will be appreciated, query reformulation process 412 may evaluate uniqueness information for other entities or information stored by or associated with isolated collection 406.

In another example, query reformulation process 412 may evaluate topology information (e.g., as may be stored in ontology data 408). Query reformulation process 412 may use topology information to determine whether the query may be more performant if reformulated to be anchored using a different resource type (e.g., by performing one or more of operations 704-714 of method 700 in FIG. 7). In an example, a query may specify a relationship between a first resource type and a second resource type, such that the query is anchored using the first resource type. Query reformulation process 412 may determine that the second resource type has, on average, fewer relationships than the first resource type, and reformulate the query accordingly such that the query is instead anchored using the second resource type and specifies a relationship between a second resource type and a first resource type. As will be appreciated, topology information may contain other information and may be used to perform other evaluations on one or more parameters of a query.

In some examples, query reformulation process 412 may use multiple techniques to reformulate a query. For example, query reformulation process 412 may use uniqueness information in conjunction with topology information when reformulating a query. In another example, query reformulation may evaluate uniqueness information, determine whether the query should be processed further, and, if it is determined that the query should be reformulated further, evaluate topology information as well. The determination may comprise evaluating the expected performance of the query or the expected amount of time required to engage in additional processing, among other factors. In another example, query reformulation component 412 may evaluate other information as an alternative to or in addition to uniqueness information or topology information. Query reformulation process 412 may also evaluate any number of factors in conjunction with one another, or evaluate one or more factors first, followed by an evaluation of one or more subsequent factors. In some examples, query reformulation process 412 may perform multiple passes, such that a query is iteratively reformulated based on similar or different factors as were considered in previous reformulation iterations.

FIG. 5 illustrates an overview of an example method 500 for generating ontology data for an isolated collection. Method 500 may be performed by a computing device (e.g., client device 402 or server device 404 in FIG. 4) or a computing component (e.g., ontology data generation process 410). In an example, method 500 may be performed periodically (e.g., at certain time intervals in response to the occurrence of an event, etc.), may be performed when the content of the isolated collection is updated, or may be performed when a query is received or evaluated, among other periods, intervals, or events. In some examples, method 500 may be performed to analyze a larger isolated collection in order to generate ontology data for a smaller, but related, isolated collection. The ontology data may then be used when reformulating queries for the smaller and/or larger isolated collections. The smaller isolated collection may be related in that it contains similar resources, relationships, and/or properties. In an example, the smaller isolated collection may have similar ontological features (e.g., similar frequencies for resource types, relationships, or properties, or the smaller isolated collection may contain similar resource types, etc.) to the larger isolated collection.

Method 500 begins at operation 502, where an isolated collection may be received or accessed. In an example, the isolated collection may be isolated collection 406 in FIG. 4. The isolated collection may be stored by the same or different computing device as is performing method 500. In some examples, the isolated collection may be stored by a storage system or data store, which may be provided by a single computing device or distributed across multiple computing devices.

At operation 504, the isolated collection may be analyzed according to aspects disclosed herein. As an example, resources, relationships, and/or properties of the isolated collection may be analyzed. Analyzing the isolated collection may comprise evaluating some or all of the isolated collection. In some examples, only a portion of the isolated collection may be analyzed. In one example, determining which parts of the isolated collection to analyze may be based on which resources, properties, or relationships are likely to be queried or whether analyzing a given part of the isolated collection would provide a benefit when reformulating a query. For example, analyzing a property that has few values (e.g., each of which are fairly common, such as a person's gender, a country code associated with resources comprising U.S. phone numbers, etc.) may provide less benefit than analyzing a property containing information that is more unique.

Moving to operation 506, ontology data may be generated based on the analysis of the isolated collection. As discussed herein, the ontology data may comprise uniqueness information and/or topology information relating to the isolated collection. The uniqueness information may comprise a uniqueness index for resource types and/or properties within the isolated collection that is determined based on analyzing other resources and properties within the isolated collection. As discussed above, the uniqueness index may be used to compare resource types and/or properties in order to determine how unique a resource type or property is in relation other resource types and/or properties. The topology information may be determined by analyzing the resources and relationships of the isolated collection in order to determine an average number of relationships for a given resource type. As will be appreciated, while examples of ontology data, uniqueness information, and topology information are given, other information relating to the isolated collection may be generated as ontology data without departing from the spirit of this disclosure.

In some examples, generating ontology data may also comprise generating one or more indexes relating to information stored by the isolated collection. In an example, specific properties or other information may be indexed (e.g., as the result of an indication received from a user or from an application or service, among others). In another example, an index may be generated based on heuristics (e.g., determining that certain properties are frequently queried, determining that indexing a property may provide a performance benefit, etc.). As an example, an index may be generated for the values associated with a property, thereby allowing query reformulation to assess which values are typically associated with a given property and to further evaluate the uniqueness of various parameters within a query in view of such data. In one example, a property index may be stored separately from the ontology data discussed above, associated with the isolated collection, or stored as part of the above ontology data, among other storage techniques.

At operation 508, the ontology data may be stored for subsequent evaluation. In an example, the ontology data may be ontology data 408 in FIG. 4. The ontology data may be stored in one or more data structures, data stores, or storage systems. As discussed above, a PATRICIA tree may be used to store at least a portion of the ontology data, such that a value (e.g., uniqueness and/or topology information) may be associated with a key (e.g., a hash of a relationship, resource type, or property) and stored in the PATRICIA tree. While specific data structures have been described herein, one of skill in the art will appreciate that other types of data structures may be employed to store ontology data without departing from the scope of this disclosure. In an example, the stored data may be associated with the isolated collection, such that it may be accessed when reformulating a query (e.g., by query reformulation process 412 in FIG. 4). Flow terminates at operation 508.

FIG. 6 illustrates an example method 600 for generating ontology data for an isolated collection. Method 600 may be performed by ontology data generation process 410 in FIG. 4. In some examples, method 600 may be performed when the content of the isolated collection is altered (e.g., when a resource, relationship, or property is added, modified, or deleted, etc.) or it may be performed occasionally.

Method 600 begins at operation 602, where information to add to an isolated collection may be received. The information may be received from a client device (e.g., client device 402 in FIG. 4), a service or application, or another source. As will be appreciated, while the instant example relates to adding information to an isolated collection, one or more of the following operations may be performed when information within an isolated collection is modified, accessed, or deleted.

At determination operation 604, a type for the information may be determined. If it is determined that the information is a property, flow branches "PROPERTY" to operation 606, where a key may be generated based on the name of the property. In an example, the key may be a hash of the value of the property or of other information associated with the property. The hash may be generated using a hashing algorithm, including, but not limited to, Secure Hash Algorithm (e.g., SHA-1, SHA-128, SHA-256, etc.), MD5, or Whirlpool. As will be appreciated, a key may be generated using any of a variety of techniques, such that they key may be used to store and retrieve information associated with the property.

Moving to operation 608, uniqueness information may be generated for the information. In an example, generating uniqueness information may comprise determining whether any pre-existing uniqueness information is available (e.g., in a data store or other storage system storing ontology data, such as ontology data 408 in FIG. 4). If it is determined that pre-existing uniqueness information is available, the pre-existing uniqueness information may be accessed and used to generate a new or updated uniqueness index for the property. In another example, if there is no pre-existing uniqueness information, a new uniqueness index may be generated.

As discussed above, the uniqueness index may be generated algorithmically (e.g., based on a statistical model, computed in relation to the observed uniqueness of other properties, etc.) or may be a frequency measurement relating to how often the property occurs within the isolated collection, among other techniques. In some examples, uniqueness indexes for various objects (e.g., resources, properties, etc.) may be relative to one another and may therefore be comparable, such that different objects may be compared based on their respective uniqueness index. In other examples, a uniqueness index may only be comparable among similar objects (e.g., a property uniqueness index may be comparable to other property uniqueness indexes, and a resource type uniqueness index may only be comparable among other resource type uniqueness indexes).

At operation 610, the uniqueness information associated with the key may be updated. In an example, updating the uniqueness information may comprise storing the uniqueness index that was generated at operation 608 in a data structure or other storage system. In some examples, the uniqueness index may be associated with or stored based on the key that was generated at operation 606 in order to facilitate retrieval of the uniqueness information (e.g., by query reformulation process 412 when reformulating a query). Flow terminates at operation 610.

Returning to determination operation 604, if it is determined that the information is a resource, flow branches "RESOURCE" to operation 612, where a key may be generated based on the resource type. In an example, the key may be a hash of the name of the resource type or of other information associated with the resource. The hash may be generated using a hashing algorithm, as discussed above. As will be appreciated, a key may be generated using any of a variety of techniques, such that they key may be used to store and retrieve information associated with or relating to the resource type.

Flow then moves to operation 608, where, as discussed above, uniqueness information may be generated for the information. In an example, generating uniqueness information for the resource type may comprise determining whether any pre-existing uniqueness information is available (e.g., in a data store or other storage system storing ontology data, such as ontology data 408 in FIG. 4). If it is determined that pre-existing uniqueness information is available, the pre-existing uniqueness information may be accessed and used to generate a new or updated uniqueness index for the resource type. In another example, if there is no pre-existing uniqueness information, a new uniqueness index may be generated.

As discussed above, the uniqueness index may be generated algorithmically or may be a frequency measurement relating to how often the resource type occurs within the isolated collection, among other techniques. In some examples, uniqueness indexes for various objects (e.g., resources, properties, etc.) may be relative to one another and may therefore be comparable, such that different objects may be compared based on their respective uniqueness index. In other examples, a uniqueness index may only be comparable among similar objects (e.g., a property uniqueness index may be comparable to other property uniqueness indexes, and a resource type uniqueness index may only be comparable among other resource type uniqueness indexes).

At operation 610, the uniqueness information associated with the key may be updated. In an example, updating the uniqueness information may comprise storing the uniqueness index that was generated at operation 608 in a data structure or other storage system. In some examples, the uniqueness index may be associated with or stored based on the key that was generated at operation 606 in order to facilitate retrieval of the uniqueness information (e.g., by query reformulation process 412 when reformulating a query). Flow terminates at operation 610.

Returning to determination operation 604, if it is determined that the information is a relationship, flow branches "RELATIONSHIP" to operation 614, where a plurality of resources associated with the relationship may be identified. In an example, identifying resources associated with the relationship may comprise accessing the isolated collection to identify the associated resources. In another example, information relating to the associated resources may be provided with the information that was received at operation 602.

Moving to operation 616, a key may be generated for each resource based on the resource's type. In an example, the key may be a hash of the name of the resource type or of other information associated with each of the resources. The hash may be generated using a hashing algorithm, as discussed above. As will be appreciated, a key may be generated using any one of a variety of techniques, such that they key may be used to store and retrieve information associated with or relating to each of the resources.

Flow then moves to operation 618, where topology information may be updated for each key. In an example, updating topology information for each key may comprise determining whether any pre-existing topology information associated with each resource type is available (e.g., in a data store or other storage system storing ontology data, such as ontology data 408 in FIG. 4). If it is determined that pre-existing topology information is available for a resource type, the pre-existing topology information may be accessed and used to generate updated topology information for the resource type. In another example, if there is no pre-existing topology information, new topology information may be generated. As discussed above, topology information may comprise information relating to how many relationships a resource type has in the isolated collection. The topology information may be an average number of relationships associated with a given resource type, or other measurement indicative of how connected the resource type is. The determined topology information for each resource type may be stored in a data structure or other storage system. In some examples, the topology information may be associated with or stored based on the key for the resource type as was generated at operation 616 in order to facilitate retrieval of the uniqueness information (e.g., by query reformulation process 412 when reformulating a query). Flow terminates at operation 618.

FIG. 7 illustrates an overview of an example method 700 for reformulating a query using ontology data. In an example, method 700 may be performed by query reformulation process 412 in FIG. 4. In some examples, method 700 may be performed by a computing device (e.g., client device 402 or server device 404 in FIG. 4). Method 700 may begin at operation 702, where a query for data in an isolated collection may be received. The query may be formulated in a query language such as Cypher or SPARQL, among others. The query may be comprised of one or more parameters or constraints relating to a relationship type, the type or content of a resource, or any other property of a relationship or a resource. In some examples, the parameters may relate to a plurality of resources (e.g., such as a friend-of-a-friend relationship or a resource that is common to a plurality of otherwise unrelated resources, etc.).

At operation 704, uniqueness information may be accessed for each parameter of the query. The uniqueness information may have been generated based on the content of the isolated collection according to aspects disclosed herein (e.g., using method 500 and/or method 600 as illustrated in FIGS. 5 and 6, respectively). In an example, the uniqueness information may have been generated from a related isolated collection of the isolated collection (e.g., where the isolated collection comprises a subset of data from the related isolated collection or where the related isolated collection has similar resource types, similar relationships, or other similarities). The uniqueness information may be accessed from a data structure or other data store associated with or relating to the isolated collection according to aspects disclosed herein.

Moving to operation 706, each parameter of the query may be evaluated based on the accessed uniqueness information. The evaluation may comprise generating a query order indicating an arrangement for one or more of the parameters of the query by ranking or ordering each of the parameters based on uniqueness. In an example, parameters relating to similar objects (e.g., relating to a resource, relationship, or property) may be evaluated in relation to similar parameters. In another example, each of the parameters may be evaluated against the other parameters (e.g., regardless of the object to which the parameter relates).

At operation 708, a determination may be made whether reformulating the query based on uniqueness information is sufficient to yield a more performant query. In an example, the determination may comprise further analyzing the uniqueness information to determine whether the uniqueness information for each of the parameters indicates that one or more of the parameters is relatively unique (e.g., as compared to a uniqueness threshold, as compared to other parameters of the query, etc.). In another example, the determination may comprise an evaluation of how the query would likely perform if executed against the isolated collection (e.g., based on historical or statistical metrics, a comparison of previous similar queries and results, etc.). As will be appreciated, any factor may be evaluated to determine whether uniqueness information is sufficient to yield a more performant query.

If it is determined that uniqueness information is sufficient, flow branches "YES" to operation 710, where the query may be reformulated based on the evaluation of the uniqueness information. In an example, reformulating the query may comprise rearranging parameters of the query, removing parameters of the query, or modifying parameters of the query, according to aspects disclosed herein. Once the query has been reformulated, the query may be provided to another computing device, application, or service, among others. In an example, the query may be provided for execution within the isolated collection such that target information may be identified. Flow terminates at operation 710.

If, however, it is determined that the uniqueness information is insufficient, flow branches "NO" to operation 712, where topology information may be evaluated. Evaluating topology information may comprise identifying a plurality of resource types to which the query is anchored and accessing topology information associated with the plurality of resource types. As discussed above, the topology information may describe the average number of relationships for a given resource type, such that it may be determined which of the resource types typically has fewer relationships.

Moving to operation 714, the query may be reformulated based on the evaluated topology information. Reformulating the query may comprise modifying a resource type to which the query is anchored such that the new anchor is a resource type having a lower average number of relationships. In some examples, this may comprise reversing one or more of the relationships specified within the query, or identifying one or more inverse relationships (e.g., there may be an inferred relationship that represents an inverse relationship for an asserted relationship specified in the query). In other examples, the reformulation may also comprise reformulating the query based on uniqueness information as was discussed above with respect to operation 710. As will be appreciated, while the above example relates to reformulating a query by altering the resource type to which the query is anchored, a query may be reformulated by using topology information in other ways, including, but not limited to, by modifying one or more relationships within the query, by reversing the direction of a relationship within the query, etc. Once the query has been reformulated, the query may be provided to another computing device, application, or service, among others. In an example, the query may be provided for execution within the isolated collection such that target information may be identified. Flow terminates at operation 714.

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, described herein.

Figure 8:
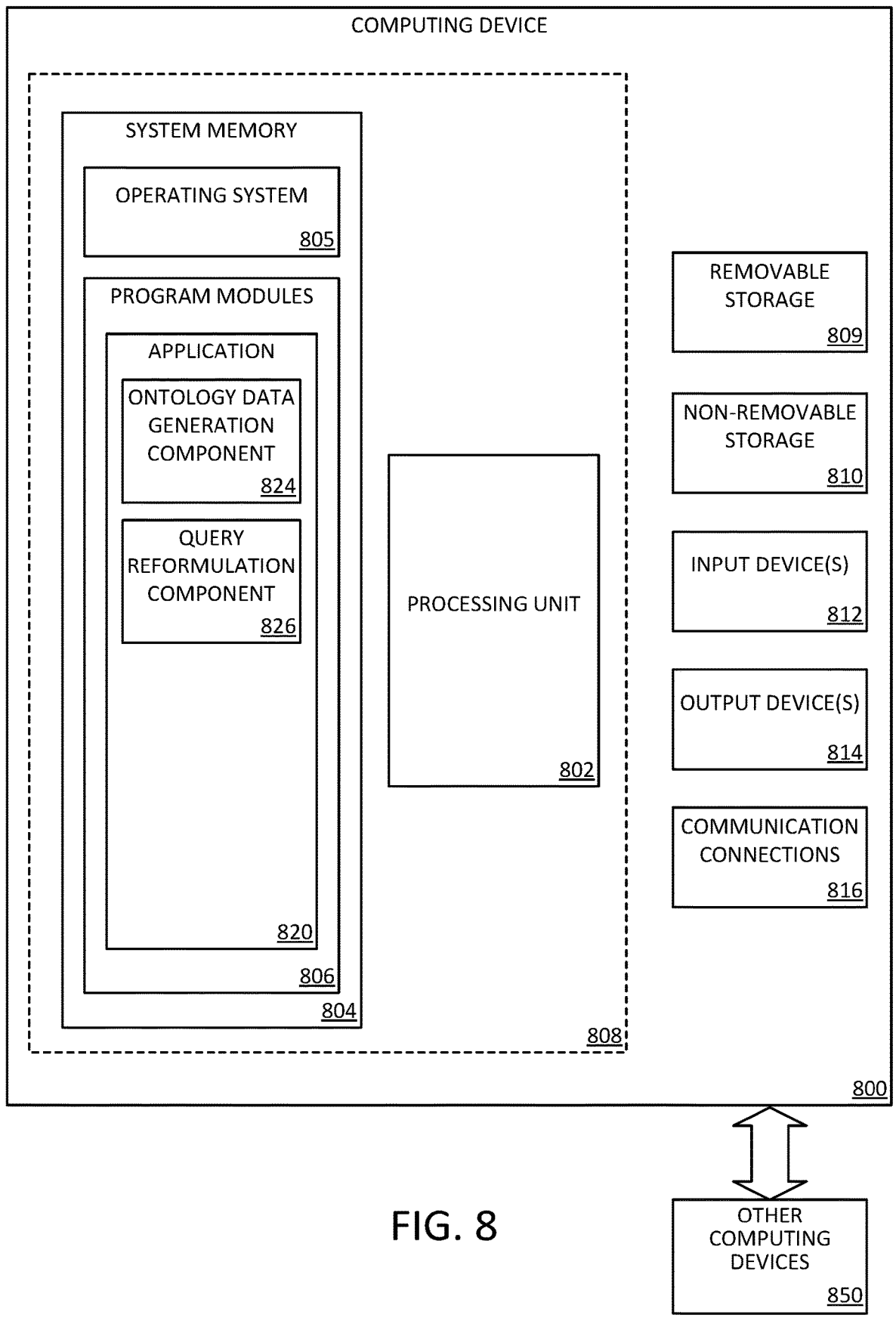
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices described above, including the client computing devices 102A-C and the server computing devices 106A-C. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for performing the various aspects disclosed herein such as an ontology data generation component 824 and a query reformulation component 826. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
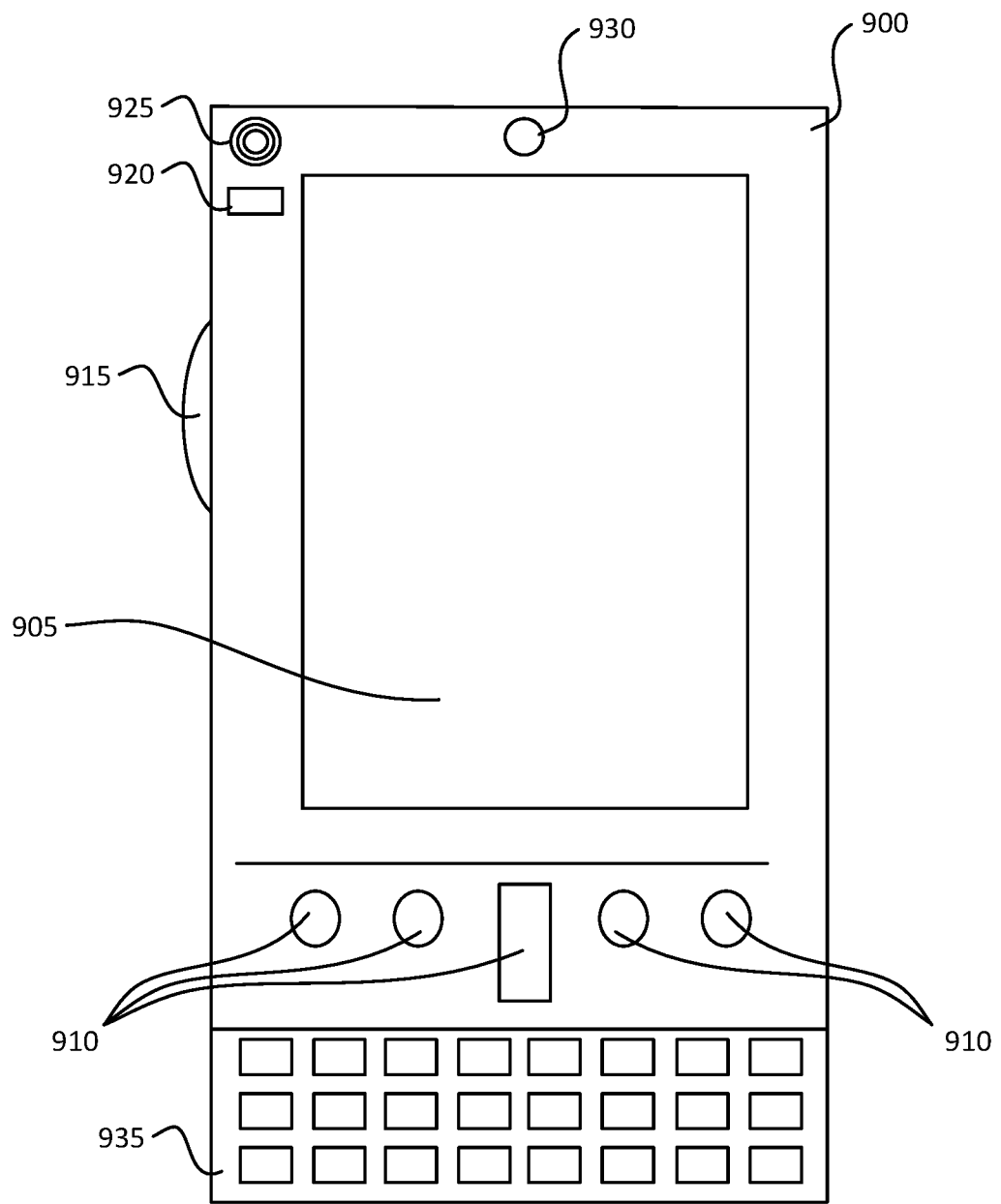
FIGS. 9A and 9B are simplified block diagrams of a mobile computing device with which aspects of the present disclosure may be practiced.
Figure 9B:
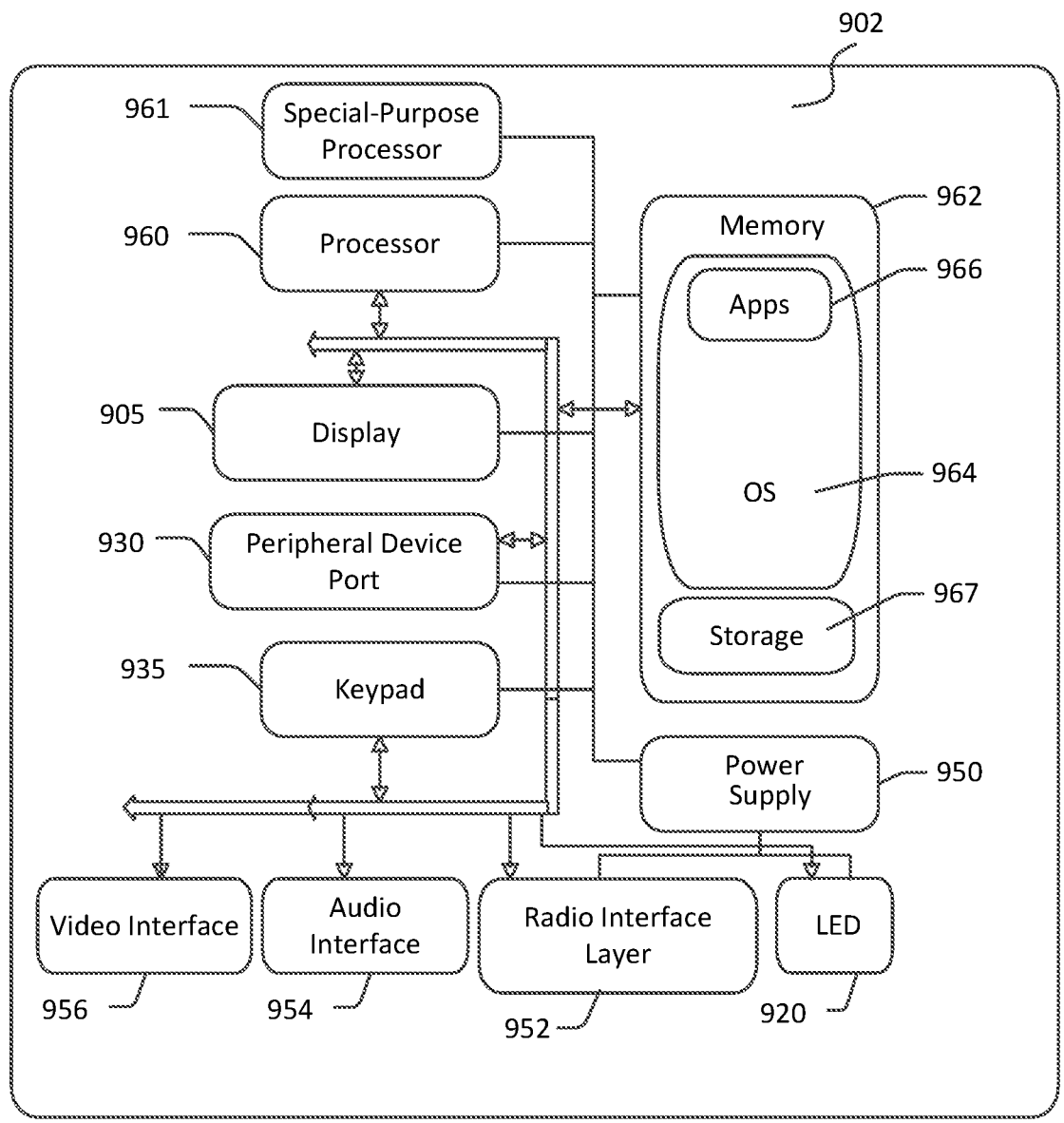

FIGS. 9A and 9B illustrate a mobile computing device 900, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
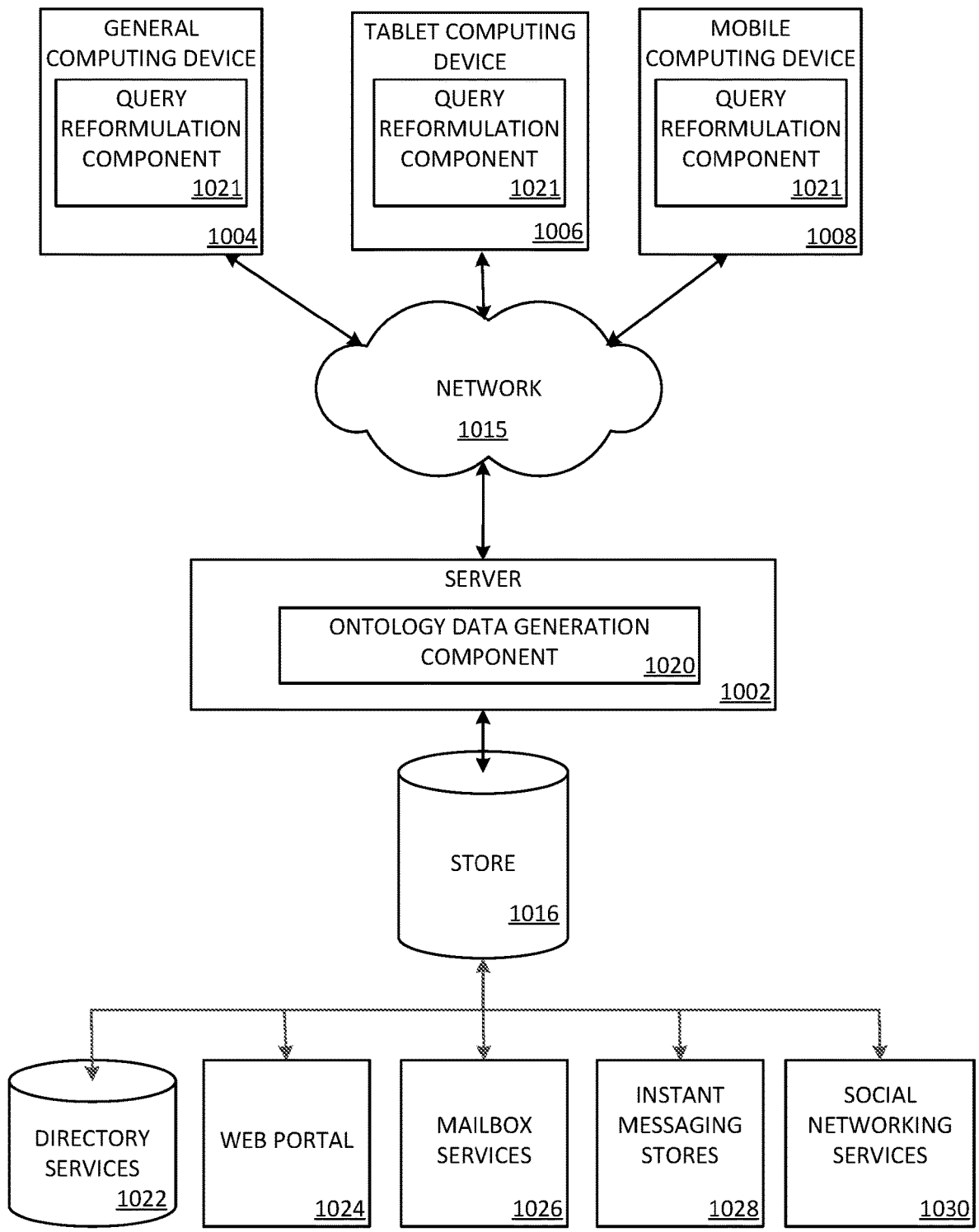
FIG. 10 is a simplified block diagram of a distributed computing system in which aspects of the present disclosure may be practiced.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. Query reformulation component 1021 may be employed by a client that communicates with server device 1002, and/or ontology data generation component 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

Figure 11:
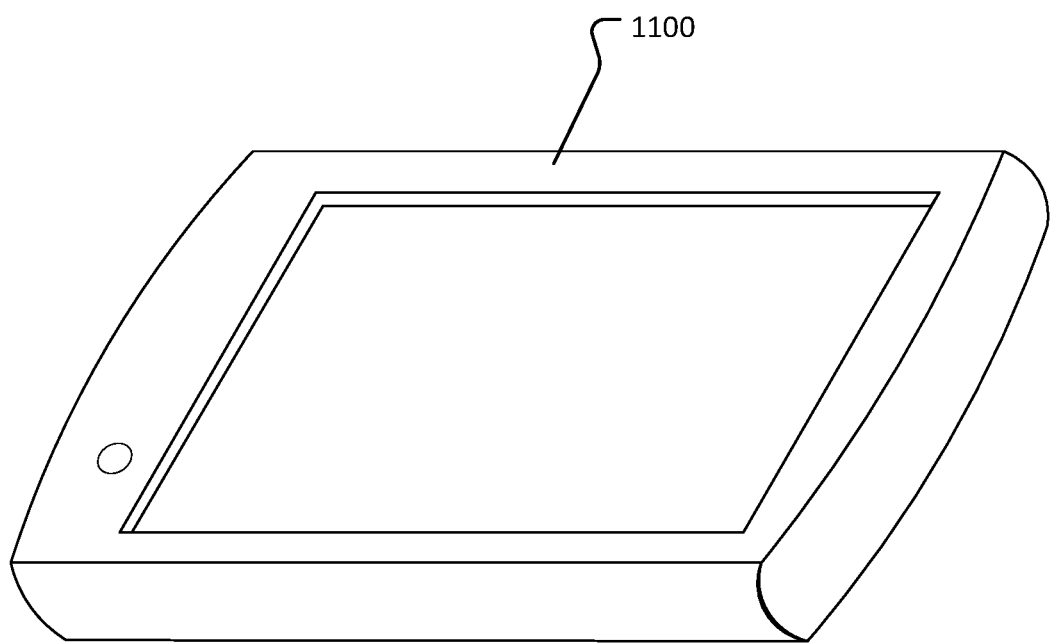
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and a memory storing instructions that when executed by the at least one processor perform a set of operations. The operations comprise: receiving a query for information stored in an isolated collection, wherein the query comprises one or more parameters; accessing ontology data relating to the isolated collection, wherein the ontology data comprises uniqueness information; identifying, using at least the uniqueness information, a level of uniqueness for each of the one or more parameters; determining, for each of the one or more parameters, a query order based on the uniqueness information identified for the parameter; generating a more performant query for the query, wherein the more performant query is comprised of the one or more parameters in the determined query order; and executing the more performant query to identify information in the isolated collection. In an example, the ontology data further comprises topology information, and the set of operations further comprises: identifying an anchor and one or more resource types for the query, wherein the anchor relates to at least one of the one or more resource types; identifying, using the topology information, an average number of relationships for each of the one or more resource types; and determining, using the average number of relationships for each of the one or more resource types, whether the anchor for the query should relate to a different group of one or more of the one or more of resource types. In another example, generating the more performant query further comprises: when it is determined that the anchor query should relate to a different group of one or more of the one or more resource types, generating the more performant query such that the different group of one or more of the one or more resource types relates to the anchor of the more performant query. In a further example, the isolated collection is associated with a related isolated collection, and the ontology data relating to the isolated collection was generated using the related isolated collection. In yet another example, the ontology data relating to the isolated collection is updated when information in the isolated collection is at least one of added, modified, and deleted. In a further still example, the ontology data relating to the isolated collection is updated periodically. In another example, the more performant query is more efficient than the received query when executed to identify information in the isolated collection.

In another aspect, the technology relates to a computer-implemented method for generating ontology data for an isolated collection. The method comprises: receiving, from a computing device, a request comprising a change to an isolated collection; determining whether the change is related to one of a resource and a property; when it is determined that the change relates to a resource, generating a key for the resource; when it is determined that the change relates to a property, generating a key for the property; generating uniqueness information based on the change, wherein the uniqueness information comprises a uniqueness index; associating the generated uniqueness information with the key; and storing, using the key, the generated uniqueness information. In an example, the method further comprises: determining whether the change is related to a relationship; when it is determined that the change relates to a relationship, identifying a plurality of resources associated with the relationship; for each of the plurality of resources: generating a key for the resource based on a resource type for the resource; generating topology information, wherein the topology information indicates an average number of relationships for the resource type; associating the generated topology information with the key; and storing, using the key, the generated topology information. In another example, storing the generated uniqueness information comprises storing the generated uniqueness information using a PATRICIA tree. In a further example, storing the generated topology information comprises storing the generated topology information using a PATRICIA tree. In yet another example, the uniqueness index indicates a relative level of uniqueness for one of a resource and a property as compared to at least one of a second resource and a second property. In a further still example, the topology information indicates a relative level of connectedness for a resource type as compared to a second resource type.

In another aspect, the technology relates to another computer-implemented method for generating a more performant query for information stored in an isolated collection. The method comprises: receiving a query for information stored in an isolated collection; identifying an anchor and one or more resource types for the query, wherein the anchor is at least one of the one or more resource types; accessing ontology data relating to the isolated collection, wherein the ontology data comprises topology information; identifying, using the topology information, an average number of relationships for each of the one or more resource types; determining, using the average number of relationships for each of the one or more resource types, whether the anchor for the query should be a different group of one or more of the one or more resource types; when it is determined that the anchor query should be a different group of one or more of the one or more resource types, generating a more performant query such that the different group of one or more of the one or more resource types is the anchor for the more performant query; and executing the more performant query to identify information in the isolated collection. In an example, the ontology data further comprises uniqueness information and the method further comprises: identifying one or more parameters of the query; identifying, using the uniqueness information, a level of uniqueness for each of the one or more parameters; and determining, for each of the one or more parameters, a query order based on the uniqueness information identified for the parameter. In another example, generating the more performant query further comprises reformulating the query such that one or more parameters of the more performant query are in the determined query order. In a further example, the isolated collection is associated with a related isolated collection, and the ontology data relating to the isolated collection was generated from the related isolated collection. In yet another example, the ontology data relating to the isolated collection is updated when information in the isolated collection is at least one of added, modified, and deleted. In a further still example, the ontology data relating to the isolated collection is updated periodically. In an example, the ontology data is stored in a PATRICIA tree.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for generating ontology data for an isolated collection, the method comprising:
   receiving, from a computing device, a request comprising a change to an isolated collection;
   determining whether the change is related to a resource or a property;
   when it is determined that the change relates to the resource, generating a key for the resource;
   when it is determined that the change relates to the property, generating a key for the property;
   generating uniqueness information based on the change, wherein the uniqueness information comprises a uniqueness index;
   associating the generated uniqueness information with the key;
   storing, using the key, the generated uniqueness information;
   determining, based on the uniqueness information, a parameter order for a query comprising multiple parameters, wherein a parameter identified by the uniqueness information as being most unique of the multiple parameters is used as an anchor resource for the query; and
   providing the query in the parameter order, wherein the query identifies target information in the isolated collection.

2. The computer-implemented method of claim 1, further comprising:
   determining whether the change is related to a relationship;
   when it is determined that the change relates to a relationship, identifying a plurality of resources associated with the relationship;
   for each of the plurality of resources:
     generating a key for the resource based on a resource type for the resource;
     generating topology information, wherein the topology information indicates an average number of relationships for the resource type;
     associating the generated topology information with the key; and
     storing, using the key, the generated topology information.

3. The computer-implemented method of claim 2, wherein storing the generated topology information comprises storing the generated topology information using a PATRICIA tree.

4. The computer-implemented method of claim 1, wherein storing the generated uniqueness information comprises storing the generated uniqueness information using a PATRICIA tree.

5. The computer-implemented method of claim 1, wherein the uniqueness index indicates a relative level of uniqueness for one of a first resource and a first property as compared to at least one of a second resource and a second property.

6. The computer-implemented method of claim 1, wherein the key for the resource is a hash of a name of the resource.

7. The computer-implemented method of claim 1, wherein the key for the property is a hash of a value of the property.

8. The computer-implemented method of claim 7, wherein the key for the property is used to store and retrieve information associated with the property.

9. The computer-implemented method of claim 1, wherein generating the uniqueness information comprises:
   determining whether pre-existing uniqueness information is available;
   if it is determined that the pre-existing uniqueness information is available, using the pre-existing uniqueness information to generate the uniqueness index.

10. The computer-implemented method of claim 9, wherein generating the uniqueness information further comprises:
   if it is determined that the pre-existing uniqueness information is not available, generating a new uniqueness index as the uniqueness index.

11. The computer-implemented method of claim 9, wherein the uniqueness index is generated algorithmically based on at least one of:
   an observed uniqueness of a set of properties, the set of properties comprising at least the property; or
   a frequency measurement relating to how often the property occurs within the isolated collection.

12. The computer-implemented method of claim 1, wherein storing the generated uniqueness information comprises:
   storing the generated uniqueness information in a data store comprising ontology data for the isolated collection.

13. A system comprising:
   a processor; and
   memory coupled to the processor, the memory comprising computer executable instructions that, when executed by the processor, perform operations comprising:
      receiving, from a computing device, a request comprising an operation related to an isolated collection;
      determining an information type associated with the operation, the information type including at least one of a property or a resource;
      generating a key based on the information type;
      generating uniqueness information for the operation;
      generating a uniqueness index for the information type based on the uniqueness information; and
      storing, using the key, the uniqueness index;
      receiving a query for target information in the isolated collection, the query having a first query order; and
      reformulating the query to a second query order based on the uniqueness index, wherein the query in the second query order:
         is more performant than the query in the first query order; and
         provides the target information.

14. The system of claim 13, wherein the operation corresponds to at least one of modifying, accessing, or deleting information within the isolated collection.

15. The system of claim 13, wherein:
   if it is determined that the information type is the property, the key is generated based on a name of the property.

16. The system of claim 15, wherein the key is generated further based on a value corresponding to the name of the property, the key being a hash of the name and the value.

17. The system of claim 13, wherein:
   if it is determined that the information type is the resource, the key is generated based on a resource type of the resource.

18. The system of claim 17, wherein the key is a hash of a name of the resource type.

19. The system of claim 13, wherein the isolated collection identifies a set of resources and a set of relationships, each resource in the set of resources being identified by a resource identifier.

20. A device comprising:
   a processor; and
   memory coupled to the processor, the memory comprising computer executable instructions that, when executed, perform operations comprising:
      receiving a request comprising a change to an isolated collection;
      determining whether the change is related to a resource or a property;
      when it is determined that the change relates to the resource, generating a key for the resource;
      when it is determined that the change relates to the property, generating a key for the property;
      generating uniqueness information based on the change, wherein the uniqueness information comprises a uniqueness index;
      associating the generated uniqueness information with the key;
      storing, using the key, the generated uniqueness information;
      determining, based on the uniqueness information, a parameter order for a query comprising multiple parameters, wherein a parameter identified by the uniqueness information as being most unique of the multiple parameters is used as an anchor resource for the query; and
      providing the query in the parameter order, wherein the query identifies target information in the isolated collection.

* * * * *